(12) United States Patent
Maier et al.

(10) Patent No.: US 11,703,804 B2
(45) Date of Patent: Jul. 18, 2023

(54) METHOD FOR MANUFACTURING TIMEPIECE THERMOCOMPENSATED HAIRSPRINGS OF PRECISE STIFFNESS

(71) Applicant: PATEK PHILIPPE SA GENEVE, Geneva (CH)

(72) Inventors: Frédéric Maier, Neuchâtel (CH); Sylvain Jeanneret, Colombier (CH)

(73) Assignee: PATEK PHILIPPE SA GENEVE, Geneva (CH)

( * ) Notice: Subject to any disclaimer, the term of this patent is extended or adjusted under 35 U.S.C. 154(b) by 476 days.

(21) Appl. No.: 16/980,124

(22) PCT Filed: Mar. 15, 2019

(86) PCT No.: PCT/IB2019/052107
§ 371 (c)(1),
(2) Date: Sep. 11, 2020

(87) PCT Pub. No.: WO2019/180558
PCT Pub. Date: Sep. 26, 2019

(65) Prior Publication Data
US 2021/0003971 A1     Jan. 7, 2021

(30) Foreign Application Priority Data

Mar. 20, 2018   (EP) ..................... 18162723

(51) Int. Cl.
*G04B 17/06*     (2006.01)
*G04D 3/00*      (2006.01)

(52) U.S. Cl.
CPC ......... *G04B 17/066* (2013.01); *G04D 3/0041* (2013.01); *G04D 3/0069* (2013.01)

(58) Field of Classification Search
CPC .......... F16F 1/024; F16F 1/10; G04D 3/0041; G04D 3/0069; G04B 17/066
See application file for complete search history.

(56) References Cited

U.S. PATENT DOCUMENTS

| 8,757,868 B2 | 6/2014 | Karapatis et al. |
| 9,428,382 B2 | 8/2016 | Hessler |

(Continued)

FOREIGN PATENT DOCUMENTS

| EP | 1 422 436 | 5/2004 |
| EP | 2 104 006 | 9/2009 |

(Continued)

OTHER PUBLICATIONS

International Search Report and Written Opinion of the ISA for PCT/IB2019/052107 dated Jul. 25, 2019, 9 pages.

(Continued)

*Primary Examiner* — Moshe Wilensky
(74) *Attorney, Agent, or Firm* — Nixon & Vanderhye

(57) ABSTRACT

The method for manufacturing timepiece hairsprings according to the invention comprises the following successive steps: a) forming hairsprings in a wafer, b) forming a thermal compensation layer on the hairsprings, c) identifying the hairsprings having a stiffness within a predetermined range, d) optionally, detaching from the wafer the hairsprings identified in step c), e) modifying the other hairsprings so that the stiffness of at least some of them is within the predetermined range, f) detaching from the wafer these other hairsprings and, if they have not been detached in step d), the hairsprings identified in step c). This method makes it possible to reduce manufacturing dispersions between the hairsprings.

12 Claims, 2 Drawing Sheets

(56) References Cited

U.S. PATENT DOCUMENTS

Figure 1:
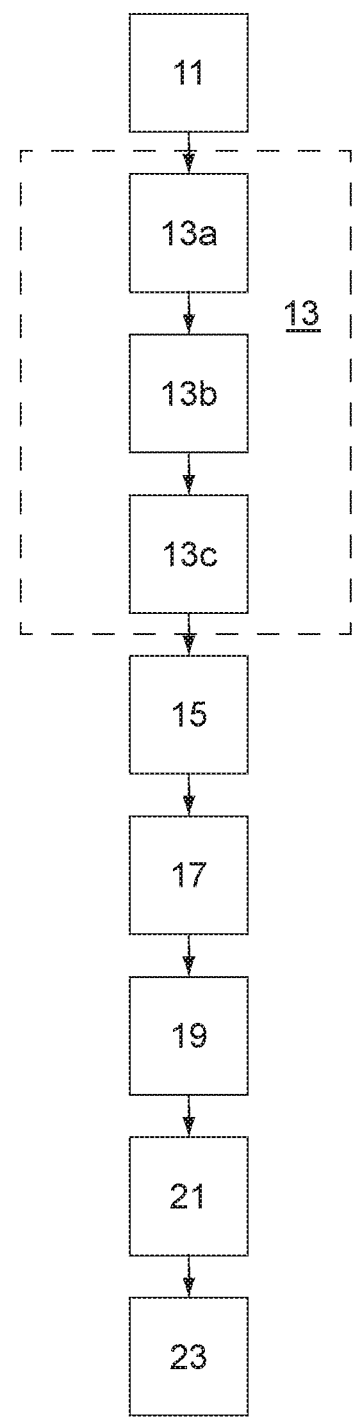

| | | |
|---|---|---|
| 9,903,049 B2 | 2/2018 | Ching et al. |
| 2009/0236782 A1 | 9/2009 | Buhler et al. |
| 2010/0006540 A1 | 1/2010 | Dinger et al. |
| 2015/0309474 A1 | 10/2015 | Bossart et al. |
| 2017/0108831 A1 | 4/2017 | Bossart et al. |
| 2017/0176940 A1 | 6/2017 | Niedermann et al. |
| 2017/0176941 A1 | 6/2017 | Kohler et al. |
| 2017/0176942 A1 | 6/2017 | Kohler et al. |

FOREIGN PATENT DOCUMENTS

| | | |
|---|---|---|
| EP | 2 397 919 A1 | 12/2011 |
| EP | 2 952 972 A1 | 12/2015 |
| EP | 3 181 938 | 6/2017 |
| EP | 3 181 939 | 6/2017 |
| JP | 2009-229463 A | 10/2009 |
| JP | 2010-017845 A | 1/2010 |
| JP | 2015-210270 A | 11/2015 |
| JP | 2017-111131 A | 6/2017 |
| JP | 2017-111132 A | 6/2017 |
| JP | 2017-111133 A | 6/2017 |
| WO | 2015/113973 A1 | 8/2015 |
| WO | 2016/128694 A1 | 8/2016 |

OTHER PUBLICATIONS

Search Report issued in Taiwanese Patent Application No. 108105999 dated Jul. 28, 2022.

METHOD FOR MANUFACTURING TIMEPIECE THERMOCOMPENSATED HAIRSPRINGS OF PRECISE STIFFNESS

This application is the U.S. national phase of International Application No. PCT/IB2019/052107 filed Mar. 15, 2019 which designated the U.S. and claims priority to EP Patent Application No. 18162723.3 filed Mar. 20, 2018, the entire contents of each of which are hereby incorporated by reference.

The present invention relates to a method for manufacturing timepiece thermocompensated hairsprings, more precisely timepiece thermocompensated hairsprings intended for use with balances in order to form timepiece mechanical oscillators therewith.

EP 1422436 discloses a timepiece thermocompensated hairspring comprising a core and a layer covering the core, the layer being formed of a material, of which the thermal coefficient of the modulus of elasticity is of opposite sign to that of the material of the core. The layer thus compensates for the variations in the modulus of elasticity of the core as a function of the temperature and its thickness can be selected to be sufficient also to compensate for the variations in the moment of inertia of the balance in order that the frequency of the oscillator is insensitive to temperature. In a typical example, the core is of monocrystalline silicon and the thermal compensation layer is of silicon oxide.

The patent applications EP 3181938 and EP 3181939 describe methods permitting manufacture of a timepiece hairspring of predetermined stiffness. In the method according to EP 3181938, a) a hairspring is formed with dimensions greater than the dimensions necessary to obtain the hairspring of predetermined stiffness, b) the stiffness of the hairspring thus formed is determined, c) the thickness of the material to be removed in order to obtain the hairspring of predetermined stiffness is calculated and d) the calculated thickness of material is removed from the hairspring formed in step a). In the method according to EP 3181939, a) a hairspring is formed with dimensions smaller than the dimensions necessary to obtain the hairspring of predetermined stiffness, b) the stiffness of the hairspring thus formed is determined, c) the missing thickness of material required to obtain the hairspring of predetermined stiffness is calculated and d) the hairspring formed in step a) is modified to compensate for the missing thickness of material. In both these methods the sequence of steps b), c) and d) can be repeated in order to refine the dimensional quality of the hairspring. After step d), a thermal compensation step is implemented according in particular to the teaching of the above-mentioned patent EP 1422436.

The methods according to EP 3181938 and EP 3181939 make it possible to reduce manufacturing dispersions between hairsprings produced from a same wafer or from different wafers. Nevertheless, differences in stiffness between the hairsprings from a same wafer are still found. In practice, several hundreds of hairsprings are produced on each wafer. The hairsprings obtained are then classified as a function of their stiffness. It is thus possible to provide several tens of classes, e.g. sixty, each containing a certain number of hairsprings. The hairsprings of each class are then matched with balances of a corresponding class—the balances are actually themselves classified as a function of their moment of inertia—in order that each balance-hairspring oscillator has substantially a predetermined frequency. Fine regulation of the frequency is then carried out typically using inertia blocks carried by the balance. The large number of classes owing in particular to the dispersion in stiffness between the hairsprings makes it necessary to manage large stocks of components.

The present invention aims to propose a method for manufacturing timepiece thermocompensated hairsprings, which makes it possible to reduce the dispersion in stiffness between the hairsprings manufactured from a same wafer.

To this end, a method is provided for manufacturing timepiece hairsprings which comprises the following successive steps:
 a) forming hairsprings in a wafer,
 b) forming a thermal compensation layer on the hairsprings,
 c) identifying the hairsprings having a stiffness within a predetermined range,
 d) optionally, detaching the hairsprings identified in step c) from the wafer,
 e) modifying the other hairsprings so that the stiffness of at least some of them is within the predetermined range, and
 f) detaching from the wafer these other hairsprings and, if they have not been detached in step d), the hairsprings identified in step c).

The present invention makes possible a fine correction on finished hairsprings in order to reduce the dispersion within a manufacturing batch. Moreover, the method according to the invention lends itself well to industrial manufacture where it is important to keep the hairsprings on the wafer for as long as possible.

Figure 2:
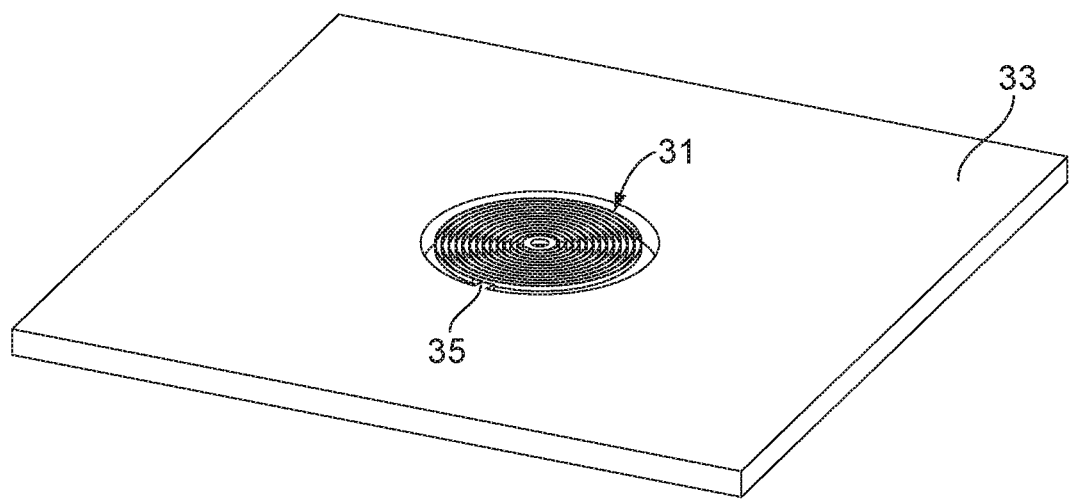
Figure 3:
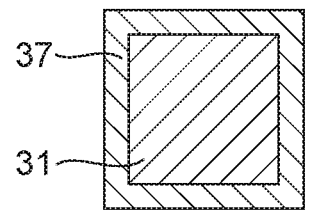
Figure 4:
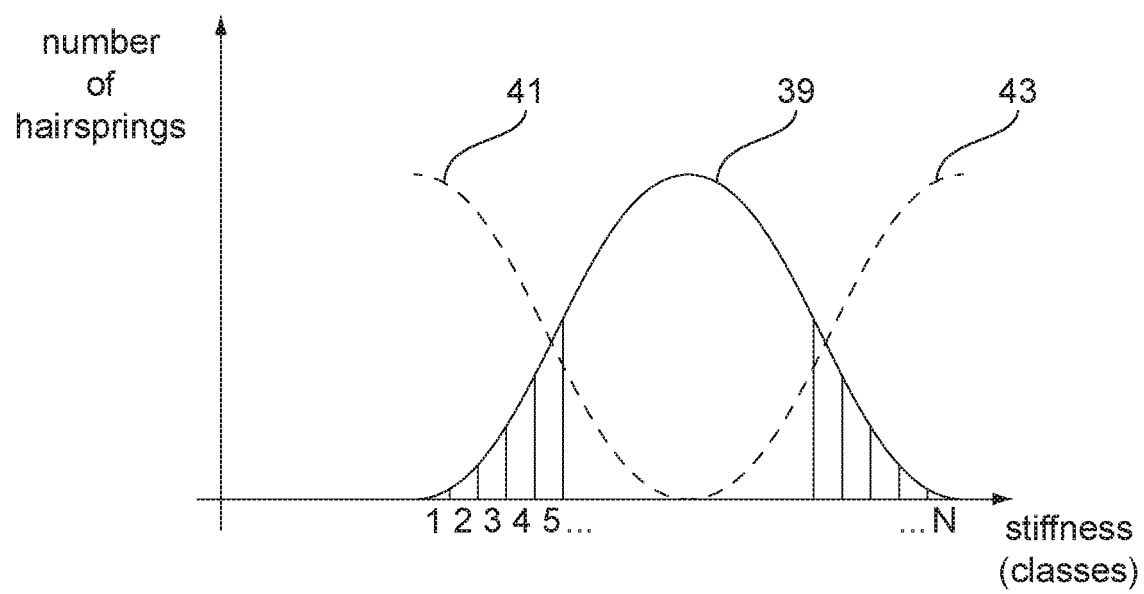

Other features and advantages of the present invention will become clear upon reading the following detailed description given with reference to the attached drawings in which:

FIG. 1 is a diagram of the method according to the invention,

FIG. 2 is a perspective view of a wafer and of a hairspring formed in the wafer in a first step of the method according to the invention, FIG. 3 is a cross-sectional view of a turn of a hairspring bearing a thermal compensation layer obtained in another step of the method according to the invention, FIG. 4 is a diagram showing the dispersion, in terms of stiffness, in hairsprings obtained in the step of FIG. 3.

With reference to FIG. 1, a method of manufacturing timepiece hairsprings according to the invention comprises successive steps 11 to 23. Said hairsprings are in particular intended to be used as elastic return elements for balances in order to form therewith mechanical timepiece oscillators, in particular for wristwatches.

In step 11, a wafer is procured and hairsprings are etched therein, e.g. by deep reactive ion etching, DRIE, or by laser etching. In preferred embodiments, the wafer is made of a silicon-based material, e.g. of silicon itself or of a multi-layer material of the silicon-on-insulator type, SOI, comprising a layer of silicon oxide between two silicon layers. In the case of silicon-on-insulator, the hairsprings obtained at the end of step 11 can be multi-layer hairsprings: silicon—silicon oxide—silicon. Multi-layer hairsprings can also be produced by etching a first part of each hairspring in a first part of the wafer and a second part of each hairspring in a second part of the wafer separate from the first part of the wafer, and then joining the two parts of the wafer. More precise details of the manufacture of multi-layer hairsprings can be found in the document WO 2016/128694. It is also possible to start with an SOI wafer, to etch the hairsprings only in its upper layer of silicon and then to remove the lower layer of silicon and the intermediate layer of silicon oxide, the wafer with which the method is continued then being formed of the upper silicon layer.

In a general manner, in the present invention the silicon can be monocrystalline, polycrystalline or amorphous. It may also be doped. Nevertheless, materials other than the silicon-based materials could be used such as a glass, a ceramic, a metal or a metal alloy.

At the end of step 11, the etched hairsprings remain attached to the wafer by bridges of material as shown in FIG. 2 where, for the sake of simplification, a single hairspring 31 has been depicted in the wafer 33, this hairspring being attached to the wafer 33 by a bridge of material 35.

In step 13, the method described in patent application EP 3181938 or in patent application EP 3181939 is applied, these two patent applications being incorporated in the present application by reference. Thus a stiffness representative of the hairsprings etched in the wafer (step 13a) is determined, the result of this determination being used to calculate a thickness of material to be added, to be removed or to be modified on the hairsprings with the aim of obtaining a predetermined stiffness (step 13b), and the calculated material thickness is used to modify the hairsprings with the aim of obtaining the predetermined stiffness (step 13c), steps 13a, 13b and 13c being repeatable once or a plurality of times.

The stiffness determined in step 13a can be the average stiffness of all the hairsprings etched in the wafer, the average stiffness of a sample of these hairsprings or the stiffness of one of these hairsprings. For a given hairspring, the stiffness can be determined by coupling the hairspring, while it is, or is not, still attached to the wafer, to a balance with a predetermined moment of inertia, by measuring the frequency of the balance-hairspring assembly and by deducing from the measurement, by calculation, the stiffness of the hairspring. It is in particular possible to effect this determination of stiffness on all the hairsprings still attached to the wafer and then to calculate the average thereof, or to effect the determination of stiffness on a sample of the hairsprings still attached to the wafer and then to calculate the average thereof, or to effect the determination of stiffness on a sample of hairsprings previously detached from the wafer and then to calculate the average thereof, these detached hairsprings being sacrificed for the remainder of the method.

Step 13c is then carried out, preferably simultaneously, on all the hairsprings attached to the wafer. If, in step 11, the hairsprings have been etched with dimensions greater than the dimensions necessary to obtain hairsprings with the predetermined stiffness, step 13c can consist of removing a thickness of material from the hairsprings, over all or part of the external surface thereof, in a homogeneous or non-homogeneous manner. If, in step 11, the hairsprings have been etched with dimensions smaller than the dimensions necessary to obtain hairsprings with the predetermined stiffness, step 13c can consist of adding a thickness of material on the hairsprings, over all or part of the external surface thereof, in a homogeneous or non-homogeneous manner.

The removal of material in step 13c can be effected by etching such as wet etching, vapour phase etching, plasma etching or laser etching. In the case of silicon-based hairsprings, the removal of material can also be effected by oxidising the hairsprings in order to transform the thickness of silicon-based material to be removed into silicon oxide ($SiO_2$), and by then removing the silicon oxide. In order to oxidise the hairsprings it is possible to place them in a furnace and subject them to a temperature between 800 and 1200° C. in an oxidising atmosphere.

The addition of material in step 13c can be carried out by any additive method, e.g. thermal oxidation, galvanic growth, physical vapour deposition, chemical vapour deposition or atomic film deposition. The material deposited on the hairsprings can be the same as that of the wafer or can be different.

As an alternative to the addition or removal of material it is possible, in step 13c, to modify a material thickness calculated in step 13b without this necessarily modifying the dimensions of the hairsprings. In particular, it is possible to modify the structure or the composition over a predetermined depth of all or part of the external surface of the hairsprings, e.g. by crystallisation, doping or diffusion of interstitial or substitution atoms.

In step 15 of the method according to the invention, a thermal compensation layer is formed on the hairsprings, preferably over the whole external surface thereof, as shown in FIG. 3 where the thermal compensation layer is designated by the reference sign 37. This thermal compensation layer is of a material having a thermal coefficient of the modulus of elasticity of opposite sign to that of the material forming the hairsprings obtained at the end of step 13. If the hairsprings are of a silicon-based material, the thermal compensation layer is typically of silicon oxide and can be obtained by thermal oxidation, by placing the hairsprings in a furnace in order to subject them to a temperature between 800 and 1200° C. and to an oxidising atmosphere. The thermal compensation layer totally or partially compensates for the variation in the modulus of elasticity of the hairsprings as a function of the temperature. The thermal compensation layer can also over-compensate for the variation in the modulus of elasticity of the hairsprings in order to also compensate for the variation, as a function of the temperature, in the moment of inertia of the balances with which these hairsprings are intended to be used and thus to make the frequency of the hairspring—balance oscillators insensitive to temperature.

In step 17, the stiffness of each of the hairsprings is determined while they are still attached to the wafer. In order to do this, for each hairspring the hairspring is coupled to a balance with a predetermined moment of inertia, the frequency of the balance-hairspring assembly is measured and the stiffness of the hairspring is deduced from this measurement by calculation. As a variation, it is possible to determine the stiffness of only some of the hairsprings and to deduce therefrom the stiffness of the other hairsprings. For example, it is possible to determine the stiffness of hairsprings representative of respective zones of the wafer, the hairsprings of a same zone having substantially the same stiffness.

At this stage of the method according to the invention, the stiffnesses of the hairsprings are spread over a number N of classes, e.g. sixty classes, on a dispersion curve of the type of curve 39 illustrated in FIG. 4. The remainder of the method according to the invention aims to reduce the number of classes. To this end, only some of the hairsprings are considered to be compliant, e.g. the N/2 first classes or the N/2 last classes, and the other hairsprings are modified to render them compliant. In this way, the number of classes can be halved.

Thus, in step 19, the hairsprings which have a stiffness in a predetermined range, corresponding e.g. to the N/2 first classes or to the N/2 last classes, are considered to be compliant and are detached from the wafer. The other hairsprings are left on the wafer.

In step 21, the hairsprings left on the wafer are modified so that the stiffness thereof is within the predetermined range. In dependence upon the selection of the predetermined range, the thickness of the thermal compensation layer is increased or decreased for all the hairsprings present on the wafer, preferably simultaneously, in order respectively to increase or decrease the stiffness of said hairsprings. The value of the thickness to be added to, or removed from, the thermal compensation layer can be previously determined by calculation. The applicant has noted in particular that for hairsprings formed from a silicon core and an external thermal compensation layer of silicon oxide with a thickness equal to 10% of the thickness (width) of the silicon core a modification of only 5% of the thickness of the thermal compensation layer permitted the number N of classes to be halved while respecting the requirements of the COSC (Contrôle Officiel Suisse des Chronometres [Swiss Official Chronometer Testing Institute]) in relation to running as a function of the temperature, namely a maximum of ±0.6 seconds/day/degree. This considerable reduction in the number of classes facilitates the management of stocks of components and reduces costs.

FIG. 4 shows that if the predetermined range of stiffnesses considered to be compliant corresponds to the N/2 first classes the modification of the hairsprings in step 21 leads to a shifting to the left of the dispersion curve of the hairsprings still on the wafer (curve 41), preferably over a distance equal to the length of the predetermined range in order that each of these hairsprings can belong to one of the N/2 first classes. Conversely, if the predetermined range of stiffnesses considered to be compliant corresponds to the N/2 last classes the modification of the hairsprings in step 21 leads to a shifting to the right of the dispersion curve of the hairsprings remaining on the wafer (curve 43), preferably over a distance equal to the length of the predetermined range in order that each of these hairsprings can belong to one of the N/2 last classes. The two configurations illustrated in FIG. 4 (curves 41 and 43) are the two optimal configurations. Of course, intermediate configurations are possible, leading to an overall number of classes, for the hairsprings detached from the wafer and those still attached, which is greater than N/2 but less than N.

In order to increase the thickness of the thermal compensation layer in step 21 it is possible, in the case of hairsprings comprising a silicon-based material core covered by a thermal compensation layer of silicon oxide, to thermally oxidise the hairsprings as described above in relation to steps 13c and 15.

In order to reduce the thickness of the thermal compensation layer in step 21 it is possible to implement etching techniques such as vapour phase etching, plasma etching, wet etching (using e.g. hydrofluoric acid) or laser etching.

As an alternative to the addition or removal of material to/from the thermal compensation layer it is possible, in step 21, to modify the structure or the composition of the thermal compensation layer over a predetermined depth without thereby necessarily modifying the thickness thereof. This modification of structure or of composition can consist e.g. of doping the thermal compensation layer by implantation, diffusion or another process.

In variations, instead of increasing the thickness of the thermal compensation layer in step 21 it is possible to deposit on this layer a material different from that of the thermal compensation layer. The deposition can be in particular a physical vapour deposition, chemical vapour deposition or atomic thin film deposition. The material different from that of the thermal compensation layer can be a metal, an oxide, a nitride or other material.

In a final step 23, the hairsprings left in the wafer are detached. All the hairsprings are then sorted according to their class in order to be able to be matched with balances.

In one variation of the invention, in step 19, the hairsprings identified as being compliant are left on the wafer but are protected, e.g. using masks, from the treatment implemented in step 21. Thus in step 21 only the hairsprings considered to be non-compliant are modified and in the last step 23 all the hairsprings are detached from the wafer.

The invention claimed is:

1. Method for manufacturing timepiece hairsprings comprising the following successive steps:
   a) forming hairsprings in a wafer,
   b) forming a thermal compensation layer on the hairsprings,
   c) identifying the hairsprings having a stiffness within a predetermined range,
   d) optionally, detaching the hairsprings identified in step c) from the wafer,
   e) modifying the other hairsprings so that the stiffness of at least some of them is within the predetermined range,
   f) detaching from the wafer these other hairsprings and, if they have not been detached in step d), the hairsprings identified in step c).

2. Method as claimed in claim 1, wherein step e) is carried out simultaneously on said other hairsprings.

3. Method as claimed in claim 1 wherein step e) comprises modifying the thermal compensation layer.

4. Method as claimed in claim 1, wherein step e) comprises modifying the thickness of the thermal compensation layer.

5. Method as claimed in claim 1, wherein step e) comprises increasing the thickness of the thermal compensation layer.

6. Method as claimed in claim 1, wherein step e) comprises reducing the thickness of the thermal compensation layer.

7. Method as claimed in claim 1, wherein it comprises, between steps a) and b), the following steps:
   (i) determining a stiffness representative of the hairsprings formed in the wafer,
   (ii) from the result of step (i), modifying the hairsprings in order to obtain a predetermined stiffness.

8. Method as claimed in claim 7, wherein between steps a) and b), the sequence of the steps (i) and (ii) is repeated once or a plurality of times.

9. Method as claimed in claim 1, wherein step a) comprises one or a plurality of etching steps.

10. Method as claimed in claim 1, wherein the hairsprings formed in step a) are of silicon or comprise at least one silicon layer.

11. Method as claimed in claim 10, wherein the thermal compensation layer is of silicon oxide.

12. Method as claimed in claim 1, wherein the hairsprings formed in step a) are of glass, ceramic, metal or metal alloy.

* * * * *